United States Patent [19]

Keilty et al.

[11] Patent Number: 5,482,511
[45] Date of Patent: Jan. 9, 1996

[54] DRIVE MECHANISMS

[75] Inventors: Peter J. Keilty, Welwyn Garden City, England; Robert I. T. Caley, Penrith, Australia

[73] Assignee: Xerox Corporation, Stamford, Conn.

[21] Appl. No.: 375,012

[22] Filed: Jan. 19, 1995

[30] Foreign Application Priority Data

Jan. 20, 1994 [GB] United Kingdom ............... 9401082

[51] Int. Cl.[6] .................................................. F16H 7/00
[52] U.S. Cl. .................... 474/84; 474/100; 474/131; 474/165; 474/205; 355/322; 222/DIG. 1; 118/644
[58] Field of Search .................................. 474/100, 101, 474/84, 131, 153, 165, 204, 205; 355/322; 222/DIG. 1; 118/644

[56] References Cited

U.S. PATENT DOCUMENTS

| | | | |
|---|---|---|---|
| 3,083,582 | 4/1963 | Wheeler | 74/229 |
| 3,866,534 | 2/1975 | Schinke et al. | 101/144 |
| 4,170,175 | 10/1979 | Conlon | 101/1 |
| 4,189,223 | 2/1980 | Silverberg | 474/104 X |
| 4,712,786 | 12/1987 | Looney | 271/201 |
| 4,769,671 | 9/1988 | Koff | 474/112 X |
| 4,949,133 | 8/1990 | Landa | 355/296 |
| 5,018,656 | 5/1991 | Phelps | 227/84 |
| 5,046,419 | 9/1991 | Zoltner | 101/235 |
| 5,149,077 | 9/1992 | Martin et al. | 271/18.3 |
| 5,394,222 | 2/1995 | Genovese | 474/102 X |
| 5,436,713 | 7/1995 | Bigelow et al. | 355/298 |

FOREIGN PATENT DOCUMENTS

| | | |
|---|---|---|
| 205860 | 12/1986 | European Pat. Off. . |
| 3328677 | 2/1985 | Germany . |

Primary Examiner—Roger J. Schoeppel
Attorney, Agent, or Firm—Kevin R. Kepner

[57] ABSTRACT

A drive mechanism including a toothed pulley and a device for retaining mesh between the teeth of the pulley and the teeth of a belt after assembly thereto. The retaining device includes a retaining member positioned adjacent a toothed section of the pulley defining a space therebetween enabling the belt to fit between the retaining member and the toothed section of the pulley when the teeth are in mesh, the space between an apex or crown of a pulley tooth and the surface of the retaining member opposite thereto being smaller than the maximum thickness of the toothed belt thereby ensuring a mesh between the teeth of the belt and pulley to provide a synchronized drive therebetween. In a particular application the drive mechanism is employed in a copy set collecting arrangement for a copy reproduction system or duplicator machine having a finishing station, the collecting arrangement including an output tray coupled to an elevator for adjusting the height of the tray in dependence on the number of copies collected, the elevator being driven by the drive mechanism.

6 Claims, 3 Drawing Sheets

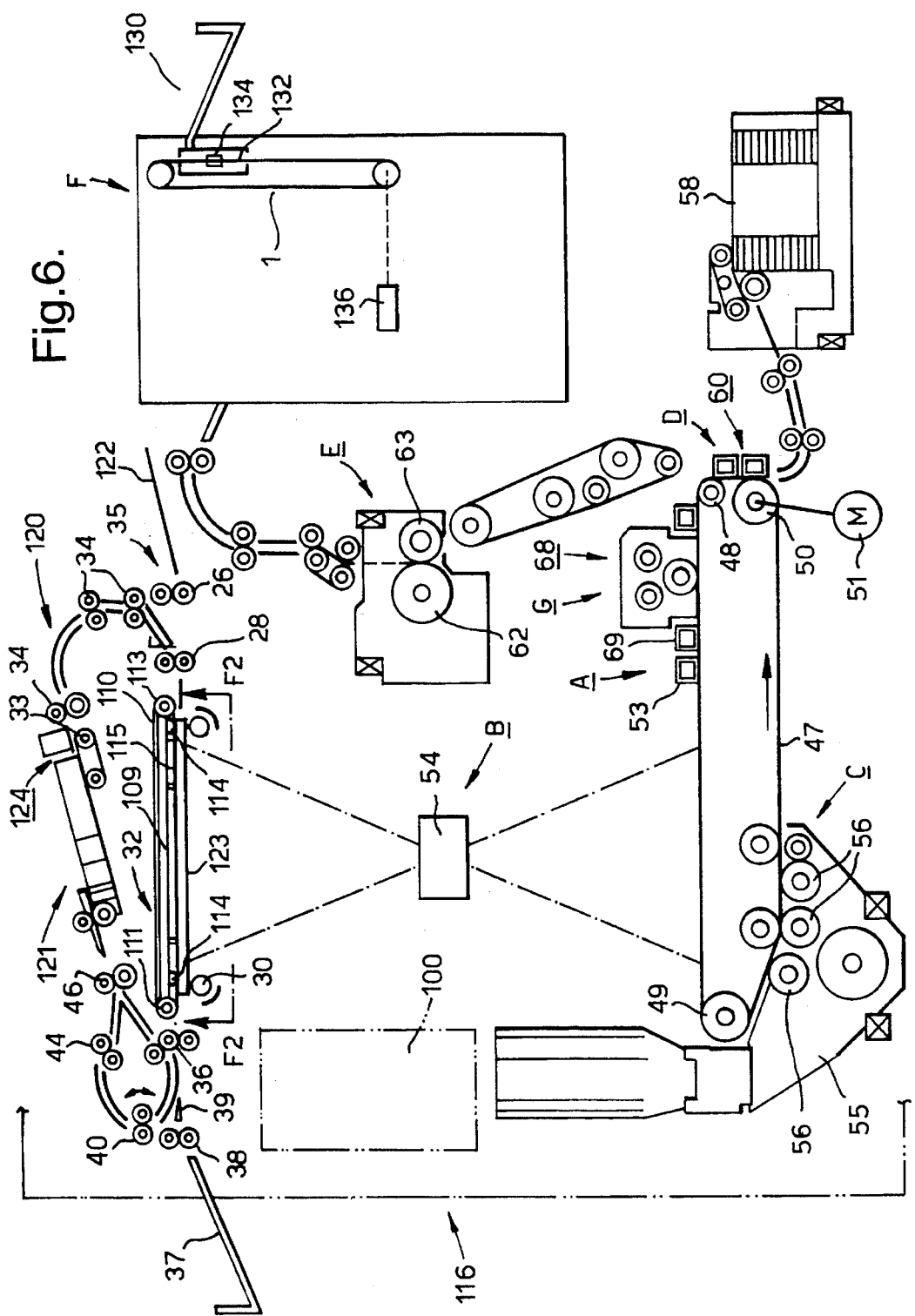

DRIVE MECHANISMS

The present invention relates to drive mechanisms and more particularly to drive mechanisms using toothed pulley and belt assemblies.

Belt and pulley assemblies are widely used as mechanisms for transferring drive between component parts of machinery. One of the problems with such mechanisms can occur when the belt and pulley assembly is subjected to high torque as this can cause the teeth of the belt to climb out of the tooth form of the pulley. The customary methods of attempting to overcome this problem are to provide belt tensioning devices and to improve tolerances between the belt and pulley so as to ensure that there is no slack in the belt. Such methods may also give rise, depending on the application, to mechanically complex and expensive arrangements incorporating metal pulleys and gear trains suitably designed to withstand the rotational forces acting on the components. Furthermore, the arrangements need to be accurately set up thereby resulting in high installation costs. In addition considerable wear is encountered on the belt, pulley teeth and motor which are all subjected to the high torque thereby leading to high maintenance and replacement costs.

A number of drive mechanisms are incorporated in copy reproduction systems or duplicator machines and the design of a mechanism to withstand high torque is often required in the finishing station associated with modern high capacity machines, particularly in finishing stations incorporating elevators. For example, in a compact copier or printer there may be provided a single output tray for receiving the copy set, the output tray being connected to an elevator for moving the tray downward as the number of copies builds up in the output tray. Perhaps as many as a thousand copies may be collected in the output tray during a single job and the weight of these copies has been found to exert considerable torque on the elevator components and on the drive shaft of the motor. It has also been found that operators of the machine sometimes lean on the output tray during the operation of the elevator mechanism thereby causing particularly high forces on the elevator and motor which result in excessive wear of components associated with an elevator and the motor causing a breakdown of the drive mechanism. To cope with such operational conditions use has been made of a metal rack and pinion device for coupling the drive from a stepping motor to the carriage carrying the output tray. Such devices although robust have the disadvantages of being heavy, expensive and noisy in operation.

There is a need to provide a cheaper and quieter drive mechanism for use with elevators in the finishing station of the copier which can also withstand the torques encountered. One object of the present invention is to provide a drive mechanism which strives to meet that need.

Accordingly, the present invention provides a drive mechanism comprising a toothed pulley and means for retaining mesh between the teeth of the pulley and the teeth of a belt after assembly thereto, characterized in that the retaining means comprises a retaining member positioned adjacent a toothed section of the pulley defining a space therebetween enabling the belt to fit between the retaining member and the toothed section of the pulley when the teeth are in mesh, the space between an apex or crown of a pulley tooth and the surface of the retaining member opposite thereto being smaller than the maximum thickness of the toothed belt thereby ensuring a mesh between the teeth of the belt and pulley to provide a synchronized drive therebetween.

In one embodiment the retaining member includes at least one projecting member extending over at least part of the toothed section of the pulley and, in a preferred embodiment, the projecting member is rotatably mounted about an axis which is spaced from and parallel to the axis of rotation of the pulley.

In a further preferred embodiment the retaining member comprises two members projecting across at least part of the toothed form of the pulley, the members being disposed on diametrically opposite sides of the pulley. In the latter embodiment each member defines with the pulley a respective space for receiving the belt, each space being substantially identical in width, and the space between an apex or crown of a pulley tooth and the surface of the retaining member opposite being smaller than the overall thickness of the belt thereby ensuring mesh between the teeth of the belt and pulley irrespective of the direction of movement of the belt or the degree of slackness in the belt. Such an arrangement is of particular use with continuous belts were there is a requirement for reversible, relative movement between the belt and pulley, such as for example with an elevator drive system used in copiers and printers.

In one embodiment the projections take the form of rollers rotatably mounted about pins. The pins extend from and are supported by a flange of a guide block arranged to be located over a shaft extending through the rotational axis of the pulley.

An aspect of the present invention is the provision of a copy set collecting arrangement for a copy reproduction system or duplicator machine having a finishing station, the collecting arrangement including an output tray coupled to an elevator for adjusting the height of the tray in dependence on the number of copies collected, the elevator having a drive mechanism comprising a toothed pulley and means for retaining mesh between the teeth of the pulley and the teeth of a toothed belt, characterized in that the retaining means comprises a retaining member positioned adjacent a toothed section of the pulley defining a space therebetween enabling the belt to fit between the retaining member and the toothed section of the pulley when the teeth are in mesh, the space between an apex or crown of a pulley tooth and the surface of the retaining member opposite thereto being smaller than the maximum thickness of the toothed belt thereby ensuring a mesh between the teeth of the belt and pulley.

In one embodiment a carriage, on which the output tray is mounted, is provided with belt attachment means whereby movement of the belt is transmitted to the carriage to adjust its height. In a preferred embodiment two belt and pulley assemblies are used, each assembly disposed on a respective opposite side of the carriage, and each belt being coupled to belt attachment means on the carriage. Using two belt and pulley assemblies on opposite sides of the carriage, as opposed to utilizing a single belt and pulley assembly disposed on only one side of the carriage, provides additional support for the weight of the carriage, output tray and any copy sets therein. One stepping motor is required for driving the two assemblies in synchronism, for example the drive shaft of the motor can be coupled, via a suitable gear train, to a common shaft extending between a pair of the pulleys of the two assemblies, the pulleys being disposed on opposing sides of the carriage.

In different embodiments either one or both of the toothed pulley and retaining member are made from plastics material.

The present invention will be described further, by way of examples, with reference to the accompanying drawings in which:

FIG. 5 is a schematic illustration showing the teeth of the belt and pulley in mesh in the gap opposite the roller and FIG. 6 is a schematic side view of a copier having a finishing station;

Figure 1:
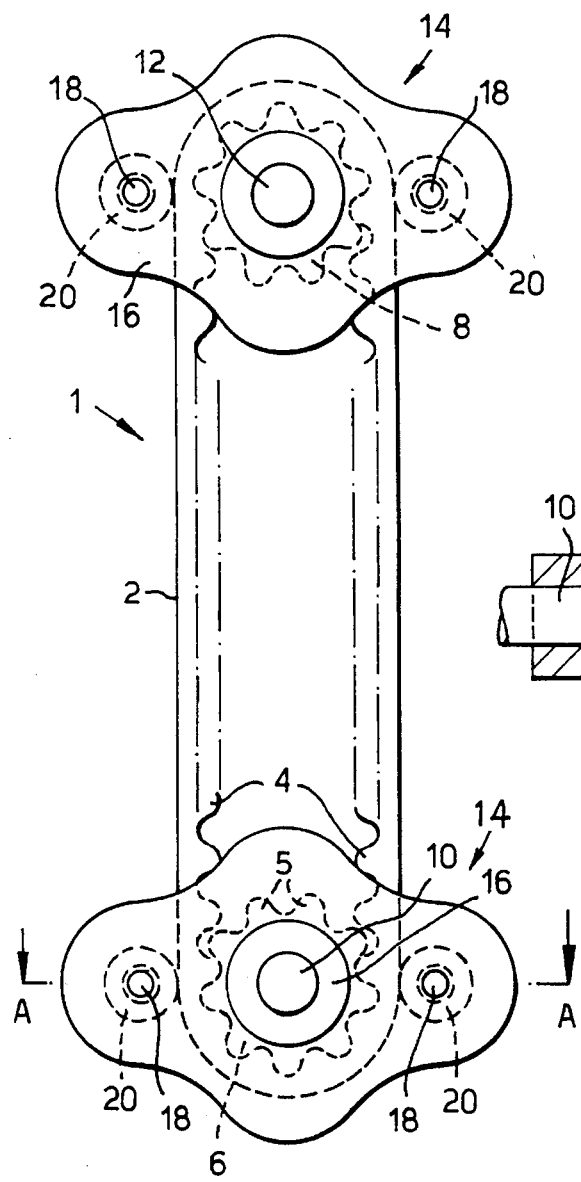
FIG. 1 is a belt and pulley assembly according to one embodiment of the invention.
Figure 2:
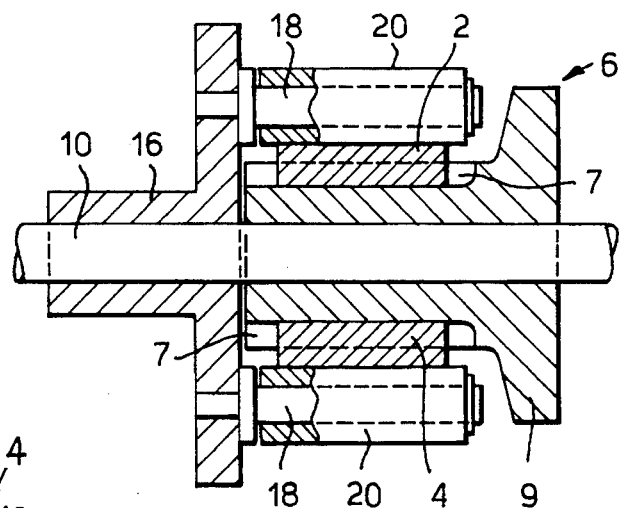
FIG. 2 is a section along the line A—A of FIG. 2.
Figure 3A:
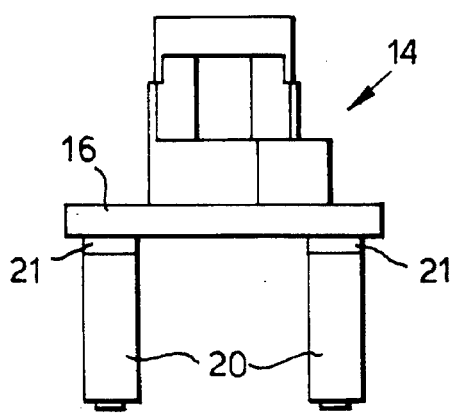
FIGS. 3a, 3b and 3c illustrate top and side perspective views of the retaining member of FIGS. 1 and 2.
Figure 3B:
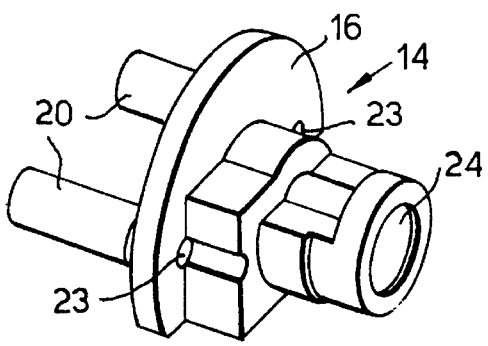
Figure 3C:
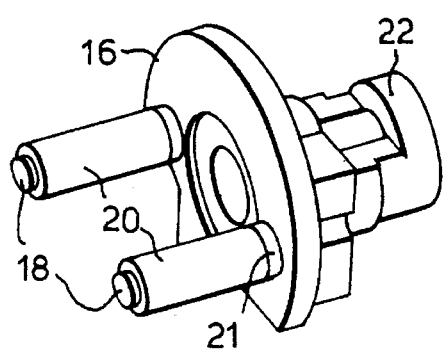
Figure 4:
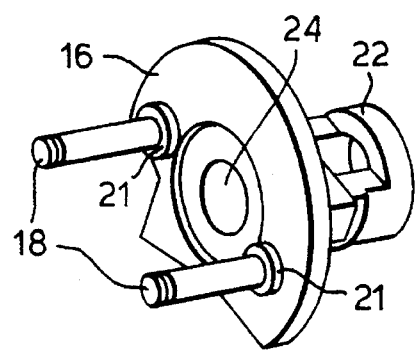
FIG. 4 is a view like that of FIG. 3c but with the rollers removed from the retaining member.

FIG. 1 illustrates a belt and pulley drive assembly 1 comprising a continuous toothed belt 2 mounted with its teeth 4 in mesh with the teeth of two toothed pulleys 6, 8. Each of the pulleys 6, 8 is rotatably mounted on a respective shaft 10, 12 on which is also coaxially mounted a retaining member 14. The retaining member 14 is better illustrated in FIG. 2 and comprises a flanged collar 16 axially mounted on the shaft 10. Extending through the flange 16 are two diametrically opposed pins 18 on each of which is rotatably mounted a respective roller 20. The pulleys 6, 8 and retaining member are conveniently molded from plastics material. For the particular application of driving an elevator in a copier machine we have found that by using the concept of the present invention one can make use of plastics material for at least the retaining member body 14, rollers 20 and pulleys 6,8. The shafts 10, 12 and the pins 18 may also be made of plastics material but in the embodiment shown in FIG. 1 steel pins and steel shafts are used.

The plastic pulley 6 has a longitudinal section 7 on which is formed the pulley teeth and an integral, radially projecting collar 9 for constraining movement of the belt 2 in a direction parallel to the axis of the pulley. Such axial movement, if allowed, may result in the belt 2 slipping at least partially off the pulley 2. Likewise the collar 9 extends sufficiently outward, radially, to act as a constraint, if needed, for preventing the plastic rollers 20 from slipping off the pins 18.

The retaining member 14 shown in more detail in FIGS. 3a, 3b, 3c and 4 is similar to that shown in FIG. 1 but with a different shape of flange 16. It will be appreciated that different contours of the flange 16 can be used, the primary function of the flange 16 serving to extend radially outwardly from the axis of the shaft 10 to a position beyond the extremities of the teeth of the pulley 6 thereby providing an outer portion of its surface on which to mount the pins 18. For this purpose the flange is provided with two diametrically opposed, thin, integral collars 21 through which, and through the adjacent flange body of which, are provided a pair of holes for receiving end portions of the pins 18. The cross section of each of the metal pins 18 is reduced at one end to define the end portion for insertion into the hole 21, the pins 18 being press fitted into the holes and being retained therein by the resilience of the plastic material of the flange and collar 21 thereby fixedly retaining the pins thereto. The main body of the retaining member 14 is molded as an integral plastic part comprising the flange 16 and a guide portion 22, the portion 22 defining a cylindrical opening 24 for receiving the steel shaft 10. The plastic rollers 20 are slid over the pins 18 so as to be rotatably mounted thereto.

Figure 5:
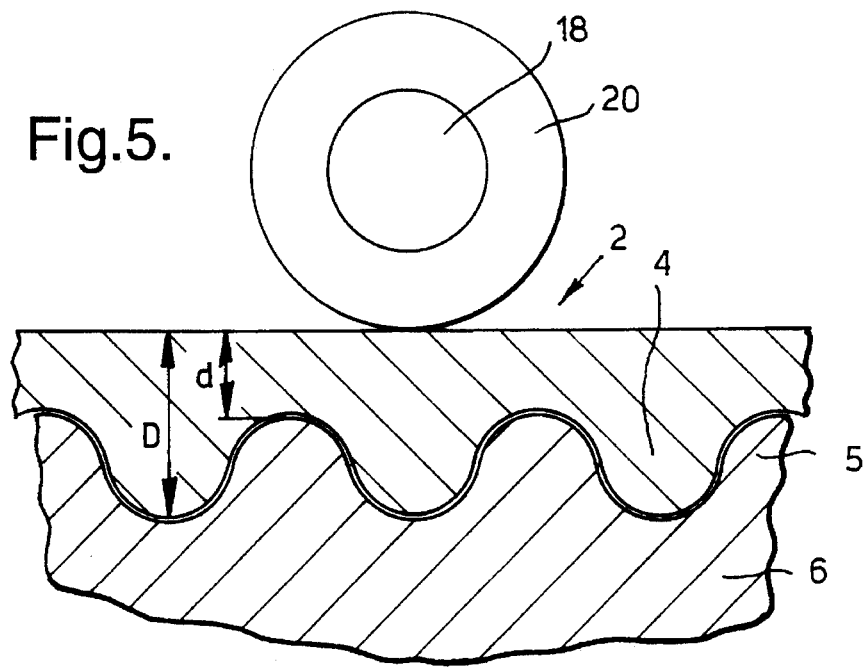

Referring again to FIG. 2, the outer surfaces of the rollers 20 and parts of the toothed form of the pulley portion 7 together define therebetween spaces for receiving the belt 2. FIG. 5 illustrates very schematically one of the rollers 20 in spaced relationship to the belt 2 and to a portion of the toothed form of the pulley. In order to maintain the teeth 4 of the belt 2 in mesh with the teeth 5 of the pulley 6 the arrangement is such that the distance, d, between the roller 20 and the apex or crown of the tooth 5 is always less than the maximum thickness, D, of the belt 2. The constraining effect on the belt 2 by the roller 20 will retain the belt teeth 4 in mesh with the opposite teeth 5 of the pulley irrespective of the degree of slackness in the belt 2. In this way a pulley and belt drive mechanism is provided in which belt tensioners are no longer required for the belt-pulley device and any torque created in the system is taken up at least partly by the slack in the belt 2 thereby reducing wear on components, enhancing performance as well as improving the energy efficiency of the drive mechanism and allowing the use of small, plastics components in situations were otherwise metal components would be the obvious choice because of their strength.

One of the applications for the belt-pulley drive mechanism is for driving elevators in the finishing station of a copier or printer. By way of example a schematic side view of a copier 116 is illustrated in FIG. 6, the operation of which is well known and will therefore be only briefly described below.

The copier 116 incorporates a recirculating document handler 124 (RDH) in the document handling system 120 to provide for automatically transporting individual registered and spaced document sheets onto and over a conventional platen imaging station 123 of the copier 116, using a friction belt platen transport system 32 overlaying the platen 123. In this example, documents are fed one at a time from the bottom of a stack placed in the tray 121 by driven belt 33 to roller sets 34 which direct documents to driven rollers 28 and then to the friction belt transport system 32 for imaging.

Documents input from the semi-automatic input are fed from shelf 122 through rollers 35 to the rollers 28.

Documents exiting the platen transport system 32 are then directed to the lower two of three rollers 36. Documents fed from the semi-automatic shelf 122 are directed to output tray 37 via decision gate 39 and rollers 38.

Documents input from the tray 121 are directed by gate 39 to rollers 40 which can rotate in a first direction to receive documents from rollers 36 and then either continue rotating to direct the documents to rollers 44 or reverse rotation to redirect the document to pass between the upper two rollers of roller set 36. Documents passing through the upper two rollers of roller set 36 and those passing through the rollers 44 are directed back to tray 121 via roller sets 46. As apparent, the described arrangement of rollers provides for both simplex and duplex imaging of documents placed in tray 121.

As is conventionally practiced, the entire document handler system 120 is pivotally mounted to copier 116 so as to be liftable by the operator away from its active position adjacent the platen. Lifting the document handler away from the platen permits manual document placement on the platen, as well as convenient clearance of jams occurring in the transport system proximate to the platen. The document handler system has external covers to cover the moving parts, which are not shown here for clarity.

The exemplary copier 116 of FIG. 6 includes a conventional photoreceptor belt 47 having a photoconductive surface on a conductive substrate and conventional xerographic stations acting thereon: charging station A, exposure station B, development station C, transfer station D, fusing station E, finish station F, and cleaning station G. The belt 47 travels about stripper roller 48, tension roller 49 and drive roller 50 which is actuated by motor 51.

The copier functions in the manner now described. The photoreceptive belt 47 is charged at station A, by a corona generating device 53. The belt 47 then passes to imaging/exposure station B, where in the exemplary copier shown, a document on platen 23 is imaged and exposed on the belt 47 by a light-lens optical input/output system 54 to form a latent image on the belt 47.

The belt 47 with the latent image thereon then passes to the developer station C where toner is delivered to the surface of the belt to develop the latent image. In this case, the developer station is a housing 55 with magnetic brushes 56 whereby toner, triboelectrically bound to carrier beads, passes from the magnetic brushes 56 and the carrier beads, to the surface of the belt 47 to develop the latent image. The belt 47 then passes to the transfer station D.

At transfer station D, a copy sheet taken from the copy tray 58 is delivered for transfer of developed image thereto. The image is transferred from the belt 47 to the copy sheet due to the higher magnitude charge on the paper due to charging elements 60. The copy sheet with the transferred image is then passed to the fusing station E, where it passes between rollers 62 and 63. In this example, roller 63 is heated to permanently bond the transferred toner image to the copy sheet. The copy is then passed to the finishing station F for any further processing of the copy sheet, such as compiling with other copy sheets and/or binding, stapling and the like. The belt 47, after passing the transfer station D then passes to cleaning station 6 which is a brush cleaner unit 68. The belt is then discharged by source 69 to prepare for another cycle beginning in the charging station A.

Conventionally, the control of all placement feeding is by a control unit 100, which is often a programmable microprocessor. A control unit of this type generally controls all functions of document handler system 120. The art readily teaches one to provide for a means and method to store and compare document and copy counts to recognize jam signals, to implement time delays and the like through the control unit 100. Further, the control unit also controls all of the imaging and printing functions and steps of copier 116 together with the finishing operations in the finishing station F. The finished copies are discharged into an output tray 130.

In one finishing application the output tray 130 is mounted for reciprocal movement along a vertically disposed axis, the output tray 130 being carried on a carriage 132 which is itself mounted for reciprocal, guided movement along vertically orientated guide channels. On each side edge of the carriage 132 is provided a belt retaining means in the form of a block clamp 134. The belt 2 of each of the assemblies 1 is clamped to the respective block 134 thereby enabling movement of the belt to control the movement of the carriage 132 and the attached output tray 130. By providing two belt and pulley assemblies 1, each disposed on an opposite side of the carriage 132 there is provided additional support for the carriage 132.

A drive motor 136, typically a stepping motor, is provided for driving the two assemblies 1 in synchronism with one another, for example the drive shaft of the motor 136 can be coupled, via a suitable gear train, to a common shaft extending between a pair of the pulleys of the two assemblies 1, the pulleys being disposed on opposing sides of the carriage 132.

The arrangement allows relaxation of the belt center tolerance reducing the cost of the frame parts and reduces the tendency for the belt to jump on the pulley under high torque conditions. Furthermore, no operator setting is required resulting in lower assembly times. The device also enables a toothed drive belt to be operated in the "slack" condition without the loss of drive to the secondary components (toothed pulleys) in the finisher output tray elevator drive mechanism.

It will be appreciated that the drive device of the present invention is not limited to use with the specific application described above. Any belt drive system can use the device. Employment of the device at the motor pulley means that motors can be mounted with fixed centers. Furthermore, belt tensioners can be eliminated, no operator setting is required and only low torque is experienced at the motor enabling smaller sizes of electric motors to be used. The belt and pulley arrangements also make for quiet running particularly when the components are plastics material, which is also a light and inexpensive material to use resulting in improved manufacturability.

I claim:

1. An electrophotographic printing machine having a finishing station, the finishing station including an output tray coupled to an elevator for adjusting the height of the tray in response to the number of copies produced, the elevator having a drive mechanism comprising:

a plurality of rotatably supported pulleys, each of said pulleys having a plurality of teeth thereon forming a tooth portion, each of said teeth having a crown portion and a root portion;

a drive belt having lugs formed integral thereon adapted to mesh with said toothed pulleys; and a retaining member adjacent at least one of said pulleys, said retaining member being spaced from a selected one of said pulleys so that the distance between said retaining member and the crown of a tooth on the selected one of said pulleys is less than a cross-sectional thickness of said drive belt through one of said lugs, said retaining member extending over at least part of the toothed portion of the selected one of said pulleys.

2. A printing machine according to claim 1, further comprising a carriage, on which the output tray is mounted, said carriage being attached to said drive belt so that movement of said drive belt is transmitted to said carriage to adjust its height.

3. A printing machine according to claim 2, further comprising a second drive mechanism comprising:

a second plurality of rotatably supported pulleys, each of said second plurality of pulleys having a plurality of teeth thereon forming a tooth portion, each of said teeth having a crown portion and a root portion;

a second drive belt having lugs formed integral thereon adapted to mesh with said second plurality of pulleys; and a second retaining member adjacent at least one of said second plurality of pulleys, said second retaining member being spaced so that the distance between said second retaining member and the crown of a tooth on the selected one of said second pulleys is less than a thickness of said second belt through one of said lugs.

4. A printing machine according to claim 3, wherein said second drive mechanism is mounted on said carriage opposite the first mentioned drive mechanism so that a load is distributed between said second drive mechanism and the first mentioned drive mechanism.

5. A printing machine according to claim 4, further comprising a motor commonly connected to one of said second plurality of pulleys and one of said first mentioned plurality of pulleys so that said pulleys are driven in synchronism.

6. A printing machine according to claim 1, further comprising a second retaining member, said second retaining member located substantially diametrically opposed with respect to the selected one of said pulleys with respect to the first mentioned retaining member.

* * * * *